March 29, 1927.
S. A. WALL ET AL
1,622,361
AUTOMOBILE SIGNAL
Filed Feb. 21, 1923    3 Sheets-Sheet 1
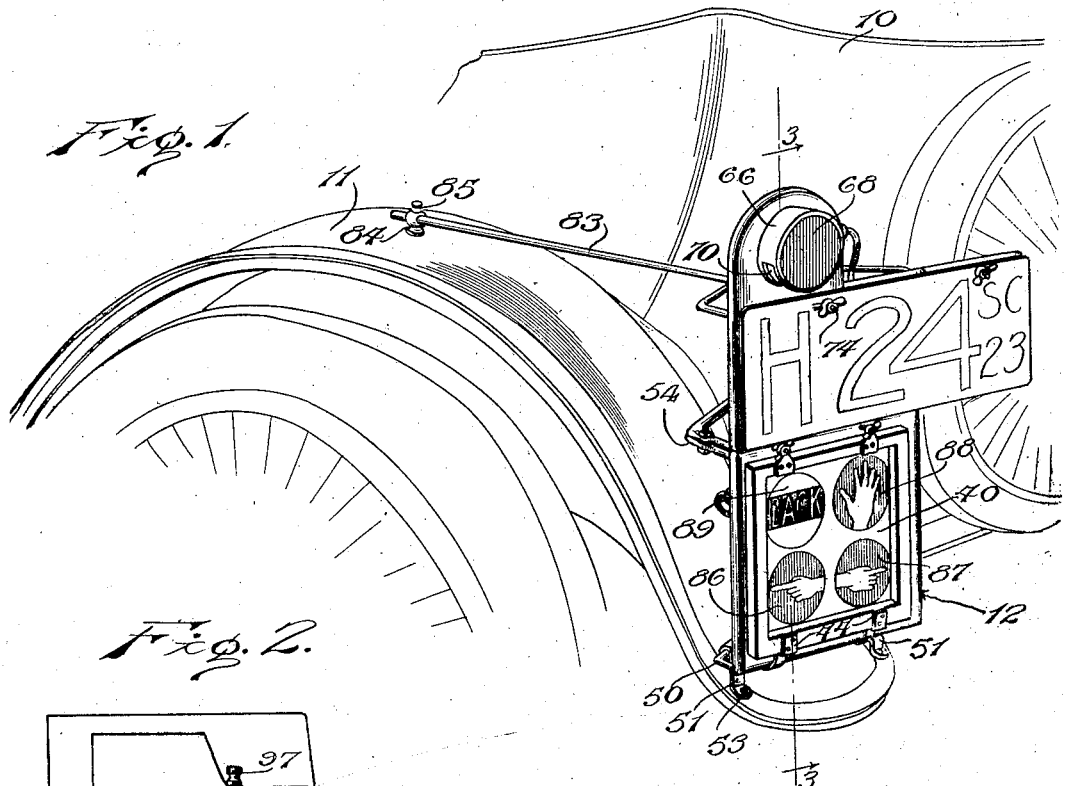
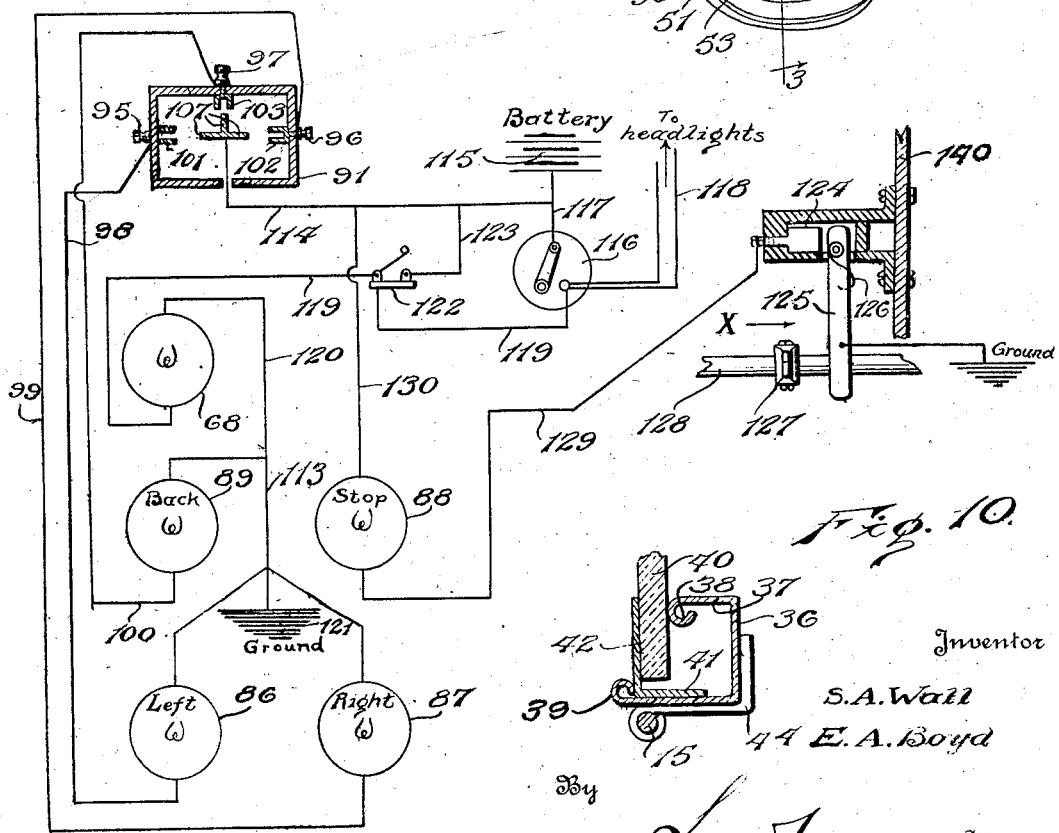
Inventor
S. A. Wall
E. A. Boyd
By Lacey & Lacey   Attorneys

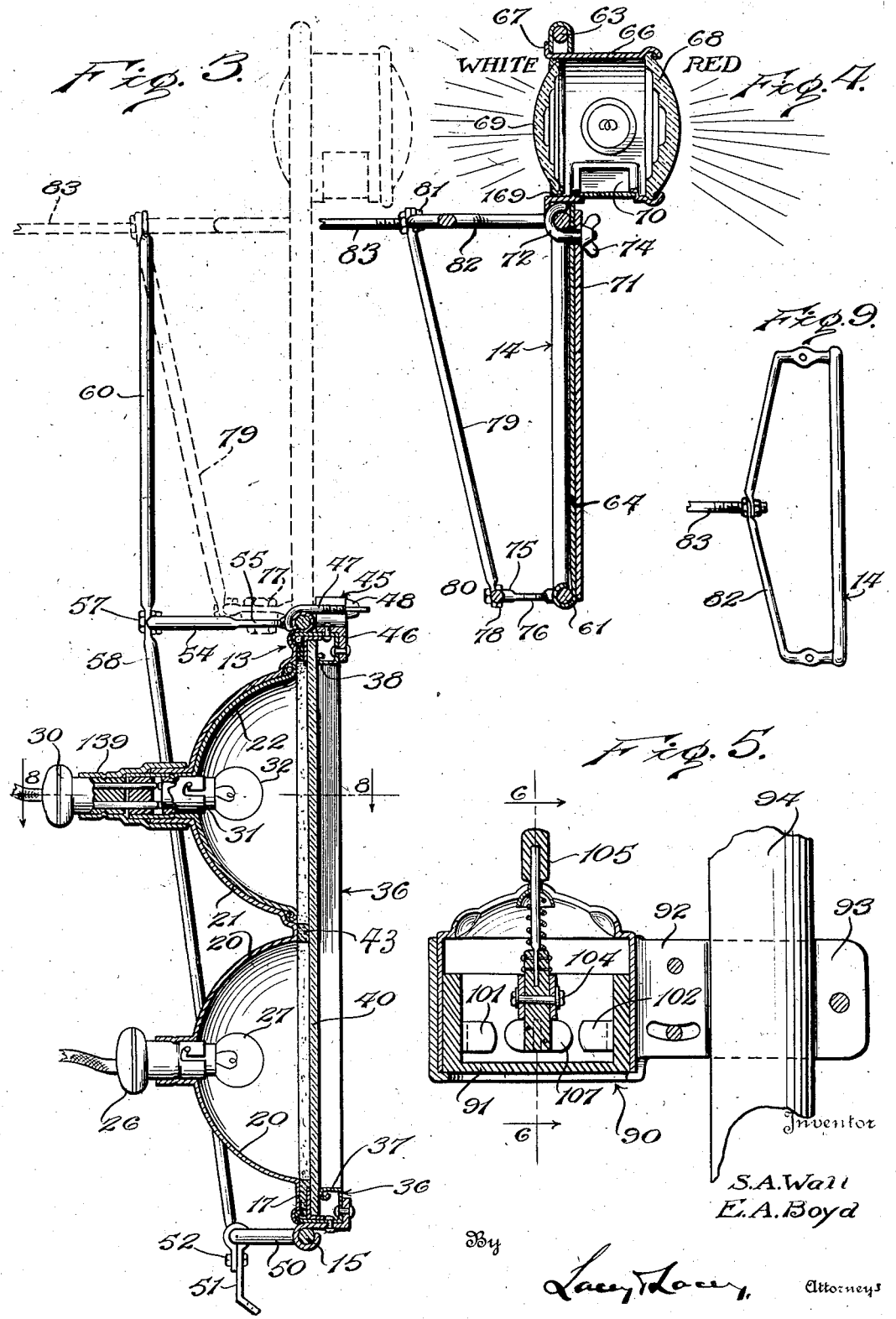

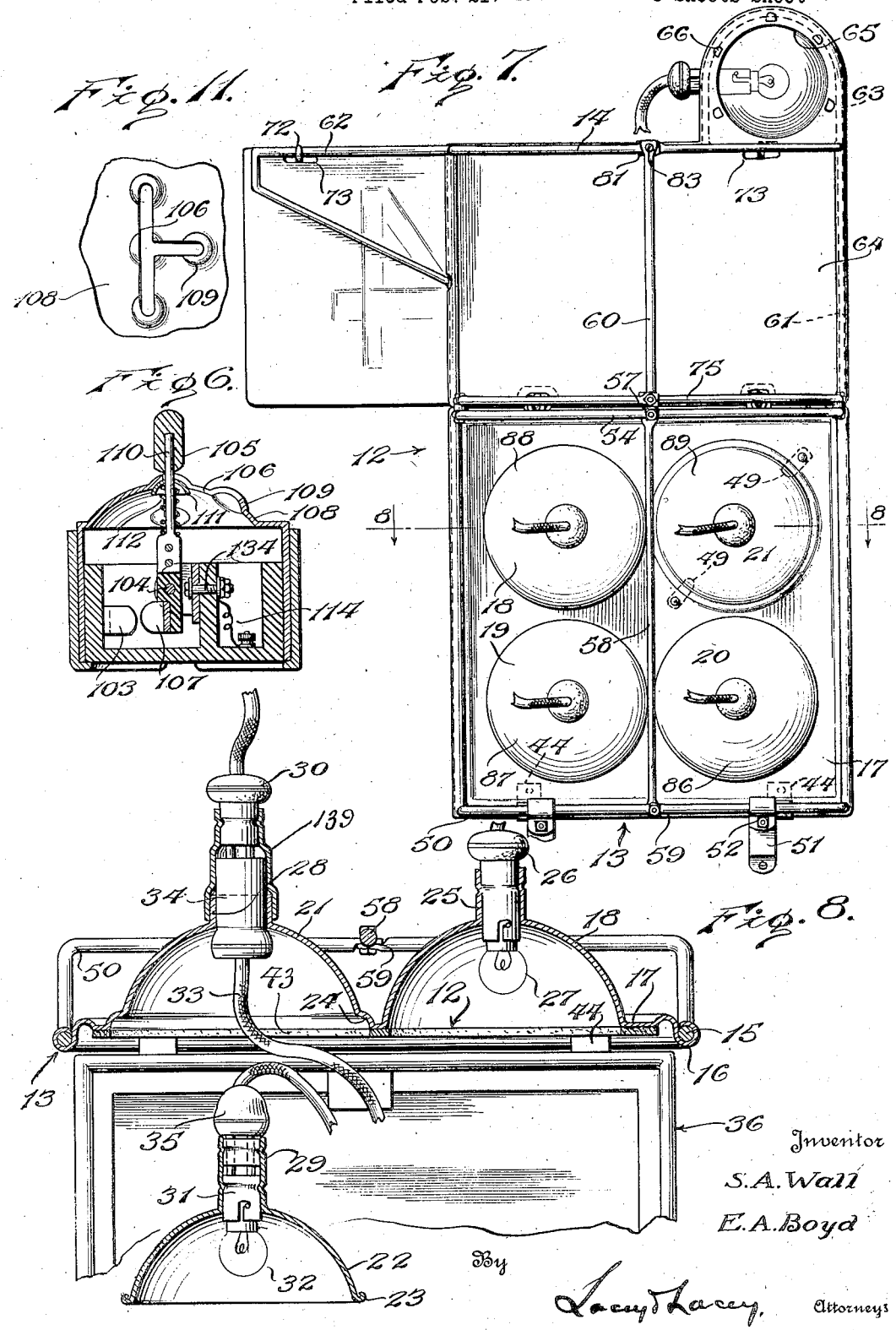

Patented Mar. 29, 1927.

1,622,361

UNITED STATES PATENT OFFICE.

SAMUEL ADAMS WALL AND EDWIN ANDERSON BOYD, OF GREENVILLE, SOUTH CAROLINA.

AUTOMOBILE SIGNAL.

Application filed February 21, 1923. Serial No. 620,396.

The present invention relates to signals for motor vehicles and particularly to electrically controlled signals.

One object of the invention is to provide a device which includes a parking or safety light as well as right and left turning signals and stop and back or reverse signals, all on the same panel.

Another object of the invention is to combine all these lights on a single frame housing, which is also adapted to carry the license plate in such a manner that it can be illuminated at night from the parking light.

Still another object of the invention is to mount the lights in such a manner that one of them, preferably the back or reverse signal lamp, can be detached and used as an emergency lamp during the repair of the vehicle and so that it can reach any part thereof.

A further object of the invention is to arrange the signaling device in such a manner, that any one of these signals can be used separately to give the desired warning and lastly to provide a housing, that is so constructed as to be water-proof, so that no water or moisture can enter the delicate parts thereof.

In the accompanying drawings, one embodiment of the invention is illustrated, and;

Figure 1 shows a fragmentary perspective rear view of an automobile with the signaling device in position;

Figure 2 is a wiring diagram for the signals;

Figure 3 is a vertical section of the casing along line 3—3 of Figure 1, with one part removed and shown in dotted lines;

Figure 4 is a similar view to Figure 3 showing the upper part removed from said Figure 3;

Figure 5 is a section of a switch used in connection with the signals;

Figure 6 is a transverse section along line 6—6 of Figure 5;

Figure 7 is a view of the casing, as seen from the forward end of the vehicle;

Figure 8 is a horizontal section along line 8—8 of Figure 7;

Figure 9 is a top plan view of Figure 4 with some parts removed;

Figure 10 is a transverse section of the lower frame seen in Figure 3; and

Figure 11 is a fragmentary top plan view of Figure 6.

In the drawings, reference numeral 10 represents the rear part of an automobile, and reference numeral 11 represents one of the wheel fenders to which the support 12 of the signaling device is rigidly secured.

The support 12 consists of a lower frame 13 and an upper frame 14 preferably made of round wire about a quarter of an inch in diameter to form respectively two rectangular structures. The lower frame 13, best seen in Figures 3, 7 and 8, consists of a wire 15 bent into two horizontal and two vertical sides forming a square, the ends of the wire being welded together to provide a good joint. To this frame 13 is secured, preferably by crimping the side edges around the sides of the frame, as at 16, a cover plate 17 stamped out of some light thin sheet metal such as aluminum and formed with four semispherical pockets 18, 19, 20 and 21, three of which, 18, 19 and 20, constitute reflectors for electric lamps, but the fourth one, 21, constitutes a receptacle for the detachable reflector 22 which has a beaded edge 23 adapted to engage in a corresponding groove 24 around the edge of the pocket. A pair of swiveled catches 49 are provided on the plate 17 so as to firmly hold the reflector therein. Each of the pockets 18, 19 and 20 is provided with a central socket 25 for receiving a contact plug 26 for the electric bulb 27, the plug entering from the forward end of the socket 25, so that the bulb 27 may be attached thereto from the inside of the pocket.

The pocket 21 is similarly provided with a shank 28, which, however, is of larger diameter than the socket 25 and around which an extension sleeve or adapter 139 is crimped or soldered. This adapter is considerably longer than the socket 25 in order to receive the shank 29 extending from the center of the reflector 22. With the reflector 22 inserted in the pocket 21, as best seen in Figure 3, the contact plug 30 is inserted in the shank or sleeve 28 so as to engage with a lamp socket 31 carrying the bulb 32. When, however, the bulb 32 is used as an emergency light, it is removed from the pocket 21, together with the reflector 22 and an extension cord 33 with its plugs 34 and 35 inserted between the socket 31 and the plug 30. The extension cord 33 is of sufficient length to permit the lamp to be carried all around the vehicle and when detached is deposited with other accessories in the tool chest of the vehicle.

The frame 13 is closed by a door 36, which is preferably pressed out of sheet metal, such as aluminum, and has an open face 37. The inner edge of this door is turned back and beaded as at 38 and its outer edge similarly turned back as at 39, and a glass 40 is pressed against the inner bead 38, as best seen in Figure 10. Straps 41 are for this purpose provided in several places along the edges of the glass and soldered to the door frame 36, and bent over the edges of the glass 40, as at 42 in Fig. 10. On the face of the cover plate 17 of the panel is cemented, or in any other suitable manner secured, a piece of felt or lining 43 with circular openings for the pockets so that when the door 36 is closed, the felt or lining 43 presses against the glass 40 to provide a perfectly tight closure for the casing, see Figure 3. At the same time it furnishes a soft backing for the glass preventing its breaking from vibration. This provides accordingly a dust-proof, water-proof, and shock-absorbing closure.

The door is carried on hinges 44, which preferably consist of narrow strips of metal bent around the bottom wire 15 and riveted or braced to the lower side of the door. It is evident that in order to wind the hinge around this wire, the cover plate 17 has to be cut away a length corresponding to the width of each hinge.

As the door is made to open downwards, latches 45 are provided at the upper side of the door. These latches are preferably made of double bent pieces of plate forming a bracket 46 riveted or brazed to the top portion of the door and carrying a hook 47 adapted to engage over the top edge of the frame 13, as best seen in Figure 3. The outer end of the hook 47 is threaded to receive a wing nut 48 and the hook 47 fits with sufficient looseness in the bracket 46, so that when the wing nut 48 is partly unscrewed, the hook will disengage from the frame and permit the swinging down of the door 36.

For the purpose of securing the frame to the rear fender of an automobile, an arched rod 50 is secured preferably by spot welding to the bottom of the frame 13. This rod carries near each end, a bracket or clamp 51, which is preferably made of a plate, bent around the rod 50 and adjustably held in position by a bolt 52. At the lower end of each clamp is provided an aperture or slot adapted to receive a clamping bolt 53 carried in a suitable aperture in the fender 11, as seen in Figure 1, and adjustable to fenders of different width and shape.

It is evident that instead of attaching the panel to the fender, it may at times be desirable to secure it in a similar manner to the tire carrier at the rear of the vehicle.

A similar arched rod 54, also bent rearwardly, is attached to the top of the frame, best seen in Figure 1, which at each end is furnished with an eye 55 to which reference will be made further on. Midway between the ends of the rod 54, the latter is flattened out to provide an eye to accommodate a bolt 57 for securing the brace 58, which extends downwardly to connect in a similar manner with an eyelet 59 furnished in the middle of the arched rod 50 at the bottom of the frame. The brace 58 has an upward extension 60, to which reference will be made further on in the description.

The top frame 14, which for the purpose of facilitating manufacture, is preferably made as a separate unit, but which could be made in one with the bottom frame 13, is constructed in the same manner as has been described with regard to the latter. A rod 61 is bent to form the square or rectangular frame with an arm 62 extending to one side and an arcuate upward projection 63. This frame 14 is covered by a plate 64 having its edges crimped around the four sides of the frame in the same manner as already described with regard to frame 13, the plate also covering the upward projection 63 where it, however, is stamped out to furnish a central opening 65. In this central opening is inserted a sleeve 66 secured in the opening by small tongues 67 engaging in corresponding slits in the plate. This sleeve constitutes a lamp holder with a red lens 68 facing rearwardly of the automobile and a white lens 69 facing forwardly thereof and carried in an inserted ring 169. At the bottom of the sleeve 66, a window 70 is cut for permitting the light to come through to illuminate the license plate 71, which extends all the way across the frame to the end of the arm 62, and this license plate is secured by means of a pair of hooks 72 engaging around the top rod of the frame and extending through slits 73 in the license plate to engage with wing nuts 74. By turning the wing nuts a quarter of a turn, so that they stand in horizontal position, it will then be possible to detach the license plate, which can then slip over the nuts 74 with its slits 73 provided for this purpose.

Similarly to the lower frame 13, the upper frame 14 is provided with a bottom arched rod 75 having side eyelets 76 corresponding to eyes 55 in the bottom frame, to which it is secured by means of bolts 77. This arched rod has also a central eyelet 78, to which the lower end of a brace 79 is secured by a bolt 80. This brace extends upwardly in slanting direction to the central eyelet provided in the arched rod 82 at the top of the frame. These two arched rods 75 and 82 are firmly secured to the frame by spot welding, or in any other suitable manner. The brace 79 may sometimes be dispensed with altogether when the top and bottom frames are secured together by the bolts 77 and to the extension 60 of the main brace 58. This extension 60 is secured to the central eye of the rod 82 by means of a nut 81, which is threaded on a distance rod 83 running in horizontal direction forwardly of the car, its forward end being secured to the fender 11 by an adjustable clamp 84. This adjustable clamp is secured in the crown of the fender 11 and has an opening running right through the same for receiving the end of the distance rod 83, the latter being secured rigidly therein by a set screw 85. In this manner the device can be adjusted for different shapes and sizes of fenders, so that the distance rod 83 can be secured nearer or further away from its free end in order to carry the panel or casing 12 in upright position, as seen in Figure 1.

With particular reference to Figure 1, the glass sheet 40 in the door of the lower frame is preferably made opaque with the exception of four circular fields in front of the lamps carried in the frame. The left bottom field 86, as seen in this figure, has a red back-ground with a white hand shown thereon pointing to the left of the frame; the right bottom field 87 has also a red back-ground with a white hand pointing to the right. The upper right field 88 has also a red back-ground with a white hand having fingers spread out to indicate "stop"; while the upper left field 89 has a red band across the same with the word "Back" in white letters thereon. Accordingly when the bulb in the reflector 20 burns, the left hand field 86 will indicate a left hand turn; with the bulb in reflector 19 burning, the right field 87 will indicate a right turn; while with the bulb in reflector 18 burning, the upper right hand field 88 will indicate "stop" or "slow"; and the circle 89 will indicate "back" or "reverse," when the bulb in reflector 22 is burning. Instead of using hands for indicating the directions, it is evident that arrows may be used, or in some instances the words "Right," "Left" and "Stop" may be shown in these circles, such modifications being covered by the scope of the claims.

In Figures 5 and 6 is illustrated a three-way switch 90 for controlling the signals shown in the fields 86, 87 and 89. This consists of a casing 91, which is carried in a bracket 92, attached by means of an adjustable clamp 93 preferably to the steering post 94, as best seen in Figure 5. The casing has three binding posts 95, 96 and 97 (see Fig. 2) connecting respectively with the lamps of the signals 86, 87 and 89 by means of conductors 98, 99 and 100. On these binding posts are contact fingers 101, 102 and 103 respectively, and centrally in the casing 91 is carried, on a universal joint, including two journal pins 104 and 134 placed at right angles to each other, a switch handle 105, which projects through the T-slot 106 furnished in the top of the casing 91. The switch rod 105 is accordingly guided to oscillate to left and right. The contact blades 107 at the lower end of the handle will on a sideways motion of the handle 105, come in contact respectively with the fingers 101 and 102 of the corresponding signals 86 and 87, and when tilted backwards in the slot 106, the blade 107 will come in contact with the fingers 103 for the signal 89. The top cover 108 of the casing is of spherical shape and at each end of the slot 106 is provided a small cup-shaped projection 109. On the stem 110 of the switch handle 105 is carried a small semispherical cap 111 with its convex surface upwards and engaging with its concave side with a coil spring 112 wound around the stem 110 and abutting with its lower end against a shoulder thereon so as to force the cap upwardly on the handle. By means of this arrangement, the handle 105 is accordingly firmly held in its central upright position, or in either one of its tilted positions, when contacting with the fingers 101, 102 and 103 respectively. It might here be noted that the three-way switch is mounted in such a manner on or near the steering post that the operator swings the switch rod 105 to the left to operate the "left turn" signal; to the right for the "right turn" signal and pulls the rod back for operating the "back" signal. In this manner the signaling is done practically automatically by the operator, as the swinging of the switch rod in the direction indicated is the most natural thing for him to do.

To complete the circuits for the signal lights 86, 87 and 89, a wire 113 connects each of them with the ground 121, and a conductor 114 leads from the battery 115 to the switch handle 105. The grounding of the lamps 27 for the signal lights 86, 87 and 88 is preferably made in their sockets, while the bulb 32 of the "back" signal 89 is grounded in the sleeve 28. The head lights 118 (see Fig. 2) are also included in the circuit through the main switch 116 which connects with the battery 115 by means of a conductor 117, and by conductors 119 and 120 to the ground 121. With the conductors 119 and 120 is connected the lamp for the parking signal or tail light, or safety lamp 68, which accordingly is always burning simultaneously with the head lights. In order that the tail light may be used independently of the head lights when the latter are turned out, by opening the main switch 116, a tail light switch 122 is furnished between the conductor 119 and the conductor 117 leading from the battery through a wire 123.

For the "stop" signal 88, an independent switch 124 is provided, secured upon the cross member 140 of the car frame. This switch is controlled by means of a lever 125 normally carried in open position by a spring 126 and extending in the path of an actuating member 127 clamped on the brake rod 128. It will be evident that when the brake rod 128 travels forward or in the direction of arrow X in Figure 2, the actuating member 127 will throw the lever 125, which is grounded, over to connect with the switch 124, which connects through the conductor 129 with one side of the lamp of signal 88, while the conductor 130 connects said lamp with the battery 115. Directly the brake rod 128 is released, the spring 126 will open the switch 124 turning out the light of the "stop" signal 88.

The use of this device furnishes a very complete signaling system for a motor vehicle, which carries a panel for the "safety" lamp showing red to the rear and white to the front of the vehicle, and which light may be controlled independently of the head lights thereof. It further carries "left turn" and "right turn" signals, as well as "stop" or "slow" signal and a "back" signal, and lastly the panel is adapted to carry the license plate in a suitable position to be always illuminated, whenever the "safety" lamp is burning so that the number of the license can clearly be seen.

In addition the "back" signal lamp may be detached from its socket in the panel after opening the door 36 and inserting an extension cable between the lamp socket and the contact plug 30 carried in the sleeve 28 in the panel.

In case the four signals carried in the lower frame are not needed, the "safety" lamp and the license plate carried on the upper frame and which are compulsory, can be attached alone to the fender or the spare tire carrier on the vehicle, or in case that a "safety" lamp and license plate are already attached to the vehicle, the lower frame with the four signal lamps may be furnished and secured to the fender as already described.

A great advantage is gained by having the reflector 22 with its lamp 32 detachable from the panel, so as to be used as an "emergency" lamp in case of accident or repair to the vehicle, as this lamp can be carried all around the same. It is evident that any one of the four lamps may be used in this manner, but it is considered that the "back" or "reverse" signal 89 is the least important and might be dispensed with, as it might happen, that the lamp were broken, when carried around the vehicle.

As the frames are made of ordinary wire, which is bent and spot welded in as few places as possible and as the sheet metal plates 17 and 64 can be easily stamped out and crimped around the frame sides, the cost of manufacture of the device is brought down to a minimum and the whole panel made very inexpensive.

As already described, light wire 15 of about a quarter of an inch diameter is preferably used for the frame, but it is evident that metal tubing to make the frame still lighter may also be used.

For the fields 86, 87, 88 and 89 showing signals, red colored glass is preferably used upon which the directions for "left" and "right" hand turn, "stop" and "back" may be produced by etching or sand blasting, so that the signals show white on the red back-ground.

With regard to the safety lamp 66, it is pointed out that this combines in itself the ordinary tail light showing red to the rear of the vehicle through lens 68 and a forwardly directed white light through the lens 69, so that this is the only lamp that need to burn, when the vehicle is parked along the curb of the street, as it defines the width of the car from the curb in both directions of the road.

Owing to the fact that the "back" signal has a red band or field across the same, sufficient light will ordinarily radiate through the white segments above and below this band when backing the car. If, however, the vehicle has to be backed in a dark and dangerous place, more light will be furnished in the rearward direction by opening the door 36 and switching on one or all of the four lamps carried in the panel.

With reference to the "safety" light 66, this is a combination "tail light" showing red to the rear, with a parking light showing white in the forward direction from the same bulb when the car is parked. This combination "safety" light replaces the regular compulsory tail and license plate light. This combination lamp can be used not only as a "parking" light, but also as a "safety" light when the car is in motion at night, because this light as seen by an approaching driver defines the exact width of the car at its widest point, and on the danger or left side of the car, the head lights being placed nearer the center of the car do not clearly define the full width thereof. The safety light may therefore prevent side-swiping, and also prevent approaching drivers from running off the road by allowing more roadway than necessary when they are uncertain as to the width of the car.

Having thus described the invention what is claimed as new is:

1. A signal for vehicles comprising an upright open wire frame, a plate secured on said frame and provided with signal areas, lamps carried by the plate in the signal areas of the same, a door hinged on the frame having transparent fields registering with respective areas of the plate, arched rods extending rearwardly from the top and bottom of said frame, braces extending between and rigidly secured to said arched rods, and means connected with the braces and the arched rods for securing the frame on a vehicle.

2. A signal for vehicles comprising upper and lower open frames, a plate on the lower frame, signal lamps on said plate, display elements on the upper frame, arched rods projecting from the top and bottom of each frame, the lower rod on the upper frame and the upper rod on the lower frame being provided with vertically registering openings, securing bolts passed through said openings, braces extending between the upper and lower rods on each frame, a brace extending between the upper rod on the lower frame and the upper rod on the upper frame, a securing device extending from the upper arched rod on the upper frame, and securing devices on the lower end of the lower frame.

In testimony whereof we affix our signatures.

SAMUEL ADAMS WALL. [L. S.]
EDWIN ANDERSON BOYD. [L. S.]